United States Patent
Kim et al.

(10) Patent No.: US 9,142,182 B2
(45) Date of Patent: Sep. 22, 2015

(54) DEVICE AND CONTROL METHOD THEREOF

(75) Inventors: Taehyeong Kim, Seoul (KR); Sunjin Yu, Seoul (KR); Hyunsook Lee, Seoul (KR); Soungmin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 872 days.

(21) Appl. No.: 13/269,320

(22) Filed: Oct. 7, 2011

(65) Prior Publication Data

US 2013/0088419 A1 Apr. 11, 2013

(51) Int. Cl.
*G09G 5/00* (2006.01)
*H04N 21/422* (2011.01)
*H04N 21/485* (2011.01)
*G06F 3/038* (2013.01)

(52) U.S. Cl.
CPC ........ *G09G 5/00* (2013.01); *G06F 3/038* (2013.01); *H04N 21/42204* (2013.01); *H04N 21/485* (2013.01); *G06F 2203/0381* (2013.01); *G09G 2354/00* (2013.01)

(58) Field of Classification Search
CPC .................................................. G06F 2203/0381
See application file for complete search history.

(56) References Cited

U.S. PATENT DOCUMENTS

| | | | | |
|---|---|---|---|---|
| 5,339,389 A * | 8/1994 | Bates et al. | | 715/742 |
| 6,204,837 B1 * | 3/2001 | Smith | | 345/157 |
| 7,158,118 B2 * | 1/2007 | Liberty | | 345/158 |
| 7,782,297 B2 * | 8/2010 | Zalewski et al. | | 345/156 |
| 2006/0082542 A1 * | 4/2006 | Morita et al. | | 345/156 |
| 2007/0035518 A1 * | 2/2007 | Francz et al. | | 345/163 |
| 2009/0073117 A1 * | 3/2009 | Tsurumi et al. | | 345/158 |
| 2009/0296991 A1 * | 12/2009 | Anzola | | 382/107 |
| 2009/0315740 A1 * | 12/2009 | Hildreth et al. | | 341/20 |
| 2010/0013812 A1 * | 1/2010 | Gu et al. | | 345/207 |
| 2010/0053110 A1 * | 3/2010 | Carpenter et al. | | 345/173 |
| 2010/0079369 A1 * | 4/2010 | Hartmann et al. | | 345/156 |
| 2010/0253621 A1 * | 10/2010 | Suzuki et al. | | 345/157 |
| 2010/0281437 A1 * | 11/2010 | Stone-Perez et al. | | 715/863 |
| 2011/0057875 A1 * | 3/2011 | Shigeta et al. | | 345/156 |
| 2011/0109539 A1 * | 5/2011 | Wu et al. | | 345/156 |
| 2011/0154266 A1 * | 6/2011 | Friend et al. | | 715/863 |
| 2011/0159929 A1 * | 6/2011 | Karaoguz et al. | | 455/566 |
| 2011/0161890 A1 * | 6/2011 | Anderson et al. | | 715/863 |
| 2011/0175827 A1 * | 7/2011 | Bogue | | 345/173 |
| 2012/0146891 A1 * | 6/2012 | Kalinli | | 345/156 |
| 2012/0256835 A1 * | 10/2012 | Musick et al. | | 345/161 |
| 2012/0295708 A1 * | 11/2012 | Hernandez-Abrego et al. | | 463/36 |
| 2012/0299827 A1 * | 11/2012 | Osborn et al. | | 345/158 |
| 2013/0009871 A1 * | 1/2013 | Kubota | | 345/157 |
| 2013/0290911 A1 * | 10/2013 | Praphul et al. | | 715/863 |

* cited by examiner

*Primary Examiner* — Amare Mengistu
*Assistant Examiner* — Crystal A Mathews
(74) *Attorney, Agent, or Firm* — Birch, Stewart, Kolasch & Birch, LLP

(57) ABSTRACT

A device and a control method for the device are disclosed. A device and a control method for the device according to the present invention comprises a sensing unit; and a controller, if at least one of a second control command is received through the sensing unit while carrying out a control operation based on at least one of a first control command received through the sensing unit, generating a display signal based on a control command selected according to a predetermined criterion from the received multiple control commands of the first and the second control command. According to the present invention, a control command for generating a display signal can be effectively selected in the case that another control command is received while a particular control command is carried out.

18 Claims, 26 Drawing Sheets

| 1st fn. | 2nd fn. |
|---|---|
| Hovering | Volume Up/Down<br>Channel Up/Down<br>Mute On/Off |

(b)

| 1st fn. | 2nd fn. |
|---|---|
| Volume Up/Down | Channel Up/Down<br>Mute On/Off |

| 1st fn. | 2nd fn. |
|---|---|
| Volume Up/Down | Changing depth of menu<br>Selecting a specific menu |

(b)

| 1st fn. | 2nd fn. |
|---|---|
| Receiving plural control signals to a same object ||

FIG. 14

| Priority | Control signal |
|---|---|
| 1 | Gesture |
| 2 | Voice |
| 3 | 3D pointing device |
| 4 | IR remote controller |
| 5 | Smart phone |

(a)

(b)

151

P

The user's gesture gains control rights — IP1

10

H (a)

(b)

DEVICE AND CONTROL METHOD THEREOF

BACKGROUND

1. Field

The present invention relates to a device and a control method for the device. More specifically, the present invention relates to a device and a control method for the device capable of effectively selecting a control command for generating a display signal in the case that another control command is received while a particular control command is carried out.

2. Related Art

As the functions of terminals such as personal computers, laptop computers, cellular phones and the like are diversified, the terminals are manufactured in the form of a multimedia player with multiple functions of shooting photos or videos; playing music, videos, and games; and receiving broadcasting programs.

A terminal as a multimedia player can be called a display device since it generally has a function of displaying video information.

Terminals can be divided into two types: a mobile and a stationary terminal. Examples of mobile terminals include laptop computers, cellular phones, etc. while examples of stationary terminals include television systems, monitors for desktop computers, etc.

SUMMARY

The present invention relates to a device and a control method for the device capable of effectively selecting a control command for generating a display signal in the case that another control command is received while a particular control command is carried out.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 8 to 11 are examples where multiple control commands are carried out at the display device of FIG. 7;

FIGS. 12 and 13 are examples where one of multiple control commands is carried out at the display device of FIG. 7;

FIGS. 14 to 18 are examples where a control command with a high priority among multiple control commands is carried out at the display device of FIG. 7;

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
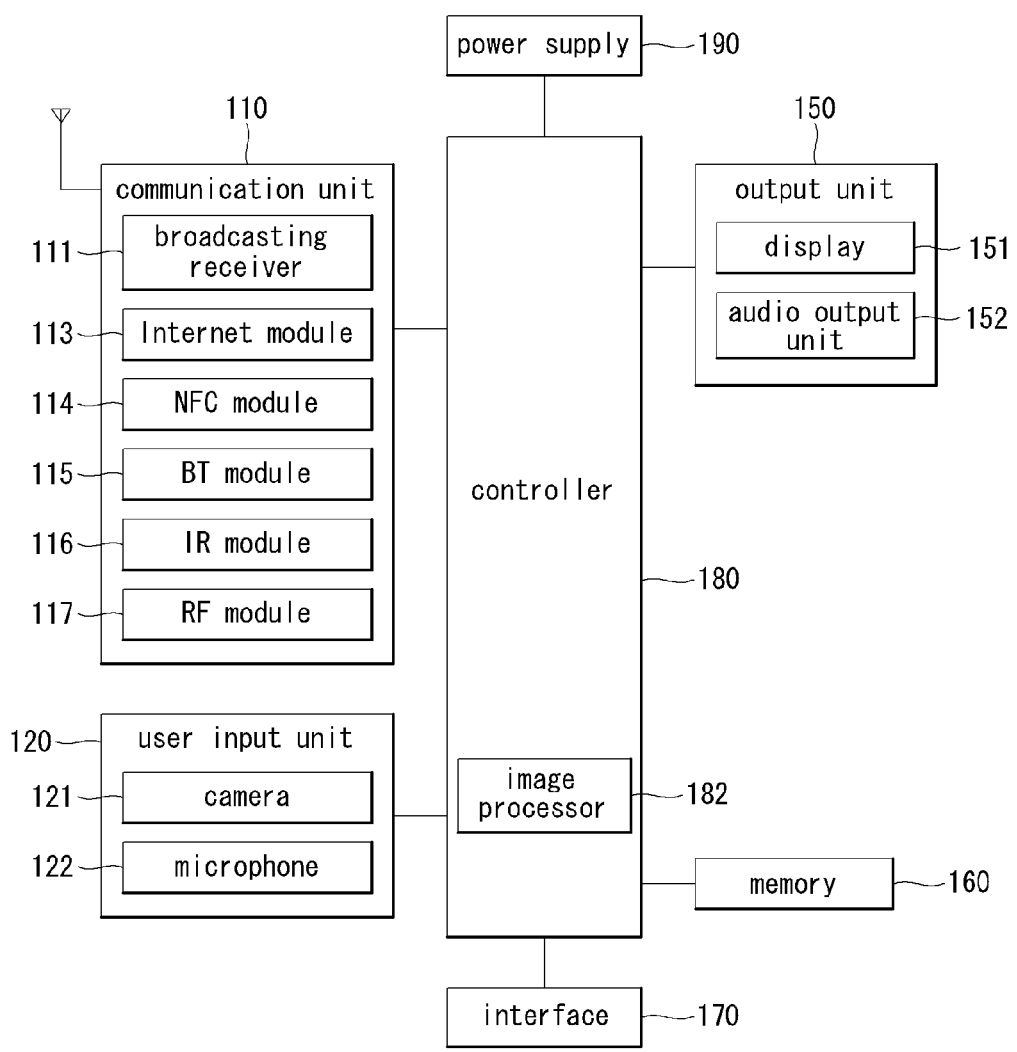
FIG. 1 illustrates a block diagram of a display device related to one embodiment of the present invention.

FIG. 1 illustrates a block diagram of a display device related to one embodiment of the present invention.

As shown in the figure, a display device 100 according to one embodiment of the present invention comprises a communication unit 110, a user input unit 120, an output unit 150, a memory 160, an interface unit 170, a controller 180, and a power supply 190. The components shown in FIG. 1 are those commonly found in a display device; therefore, display devices can be implemented with a larger or a smaller number of components than that of FIG. 1.

The communication unit 110 can include more than one module which enables communication between the display device 100 and a communication system or between the display device 100 and other devices. For example, the communication unit 110 can include a broadcasting receiver 111, an Internet module 113, a near field communication (NFC) module 114, a Bluetooth (BT) module 115, an infrared (IR) module 116, and a radio frequency (RF) module 117.

The broadcasting receiver 111 receives a broadcasting signal and/or broadcasting-related information from an external broadcasting management server through a broadcasting channel.

The broadcasting channels can include a satellite and a terrestrial channel. The broadcasting management server can indicate a server generating and transmitting broadcasting signals and/or broadcasting-related information; or a server receiving broadcasting signals and/or broadcasting-related information and transmitting them to terminals. The broadcasting signals include TV broadcasting signals, radio broadcasting signals, and data broadcasting signals. Furthermore, the broadcasting signal can further include such a broadcasting signal in the form of a combination of a TV broadcasting signal or a radio broadcasting signal with a data broadcasting signal.

The broadcasting-related information can correspond to the information related to broadcasting channels, broadcasting programs, or broadcasting service providers. The broadcasting-related information can also be provided through a communication network.

The broadcasting-related information can be provided in various forms. For example, the broadcasting-related information can be provided in the form of EPG (Electronic Program Guide) of DMB (Digital Multimedia Broadcasting) or ESG (Electronic Service Guide) of DVB-H (Digital Video Broadcast-Handheld).

The broadcasting receiver 111 can receive broadcasting signals by using various broadcasting systems. The broadcasting signal and/or broadcasting-related information received through the broadcasting receiver 111 can be stored in the memory 160.

The Internet module 113 is a module for connecting to the Internet. The Internet module 113 can be installed inside or outside the display device 100.

The NFC (Near Field Communication) module 114 is a module carrying out communication according to NFC protocol. The NFC module 114 can commence communication through tagging motion for NFC devices and/or NFC tags. For example, if an electronic device with NFC function is tagged to the display device 100, it indicates that an NFC link can be established between the electronic device and the display device 100. The electronic device and the display device 100 can transmit and receive necessary information to and from each other through the established NFC link.

The Bluetooth module 115 is a module carrying out communication according to Bluetooth protocol. The Bluetooth module 115 carries out communication based on short range wireless networking technology co-developed by Bluetooth SIG (Special Interest Group). By using the Bluetooth module 115, the display device 100 can carry out Bluetooth communication with other electronic devices.

The infrared module 116 is a module carrying out communication by using infrared rays.

The radio frequency (RF) module 117 is a module carrying out wireless communication with the display device 100. The RF module 177 can employ a communication technology different from the other communication modules mentioned earlier.

The user input module 120 is used for inputting audio or video signals, which can include a camera 121, a microphone 122, etc.

The camera 121 processes image frames such as photos or videos obtained by an image sensor at video telephony mode or shooting mode. The image frames processed can be displayed on the display unit 151. The camera 121 can correspond to a camera 121 capable of 2D or 3D imaging, where the camera 121 can consists of a single 2D or 3D camera or a combination of both.

Image frames processed by the camera 121 can be stored in the memory 160 or transmitted to the outside through the communication unit 110. Depending on the configuration of the display device 100, two or more cameras 121 can be installed.

The microphone 122 receives external sound signals and transforms the received signals to voice data in the telephony mode, recording mode, or voice recognition mode. The microphone 122 can employ various noise suppression algorithms to remove noise generated while external sound signals are received.

The output unit 150 can include a display unit 151 and an audio output unit 152.

The display unit 151 displays information processed within the display device 100. For example, the display unit 151 displays an UI (User Interface) or a GUI (Graphic User Interface) related to the display device 100. The display unit 151 can employ at least one from among liquid crystal display, thin film transistor-liquid crystal display, organic light-emitting diode, flexible display, and 3D display. In addition, the display unit 151 can be implemented in the form of a transparent or light-transmission type display, which can be called a transparent display. A typical example of a transparent display is a transparent LCD. The rear structure of the display unit 151 can also employ the light-transmission type structure. Thanks to the above structure, the user can see objects located in the back of the terminal body through the area occupied by the display unit 151 of the body.

Depending on how the display device 100 is implemented, two or more display units 151 can exist. For example, in the display device 100, multiple display units 151 can be disposed being separated from each other or as a whole body in a single area; alternatively, the multiple display units 151 can be disposed respectively in different areas from each other.

In the case where the display unit 151 and a sensor detecting a touch motion (hereinafter, it is called a 'touch sensor') form a mutual structure between them (hereinafter, it is called a 'touch screen'), the display unit 151 can also be used as an input device in addition to an output device. The touch sensor can take the form of a touch film, a touch sheet, and a touch pad, for example.

A touch sensor can be formed in such a way to transform the change of pressure applied to a particular part of the display unit 151 or the change of capacitance generated at a particular part of the display unit 151 into the corresponding electric signal. The touch sensor can be so fabricated to detect the pressure at the time of touch motion as well as the touch position and area.

When a touch input is applied to the touch sensor, a signal corresponding to the touch input is forwarded to a touch controller. The touch controller processes the signal and transfers the data corresponding to the signal to the controller 180. In this way, the controller 180 can know which area of the display unit 151 has been touched.

The audio sound unit 152 can output audio data received from the communication unit 110 or stored in the memory 160. The audio sound unit 152 can output sound signals related to the functions carried out in the display device 100 (for example, a call signal receiving sound and a message receiving sound). The audio output unit 152 can comprise a receiver, a speaker, and a buzzer.

The memory 160 can store programs specifying the operation of the controller 180 and temporarily store input/output data (for example, a phonebook, a message, a still image, and a video). The memory 160 can store data related to various patterns of vibration and sound generated at the time of touch input on the touch screen.

The memory 160 can be realized by at least one type of storage media including flash type memory, hard disk, multimedia card micro memory, card type memory (e.g., SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), magnetic memory, magnetic disk, and optical disk.

The display device 100 can function in association with a web storage which can perform a storage function of the memory 160 on the Internet.

The interface unit 170 serves as a passage to all the external devices connected to the display device 100. The interface unit 170 receives data from external devices or receives power and delivers the received data and power to each of constituting components within the display device 100 or transmits the data within the display device 100 to external devices. For example, the interface unit 170 can include a wired/wireless headset port, an external charger port, a wired/wireless data port, a memory card port, a port connecting a device equipped with an identification module, an audio I/O (Input/Output) port, a video I/O port, and an earphone port.

The controller 180 usually controls the overall operation of the display device. For example, the controller 180 carries out control and processing for voice, data, and video communication. The controller 180 can be equipped with an image processor 182 for processing images. Description of the image processor 182 will be provided more specifically in the corresponding part of this document.

The power supply 190 receives external and internal power according to the control of the controller 180 and provides power required for the operation of each constituting component.

Various embodiments described in this document can be implemented in a computer or in a recording medium readable by a device similar to the computer, both of which utilizing software, hardware, or a combination of software and hardware. As for hardware implementation, the embodiment of this document can be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro-controllers, micro-processors, and electric units for carrying out functions. In some cases, the embodiments can be implemented by the controller 180.

As for software implementation, embodiments such as procedures or functions can be implemented together with separate software modules supporting at least one function or operation. Software codes can be implemented by a software application written by a relevant programming language. Also, software codes can be stored in the memory 160 and carried out by the controller 180.

Figure 2:
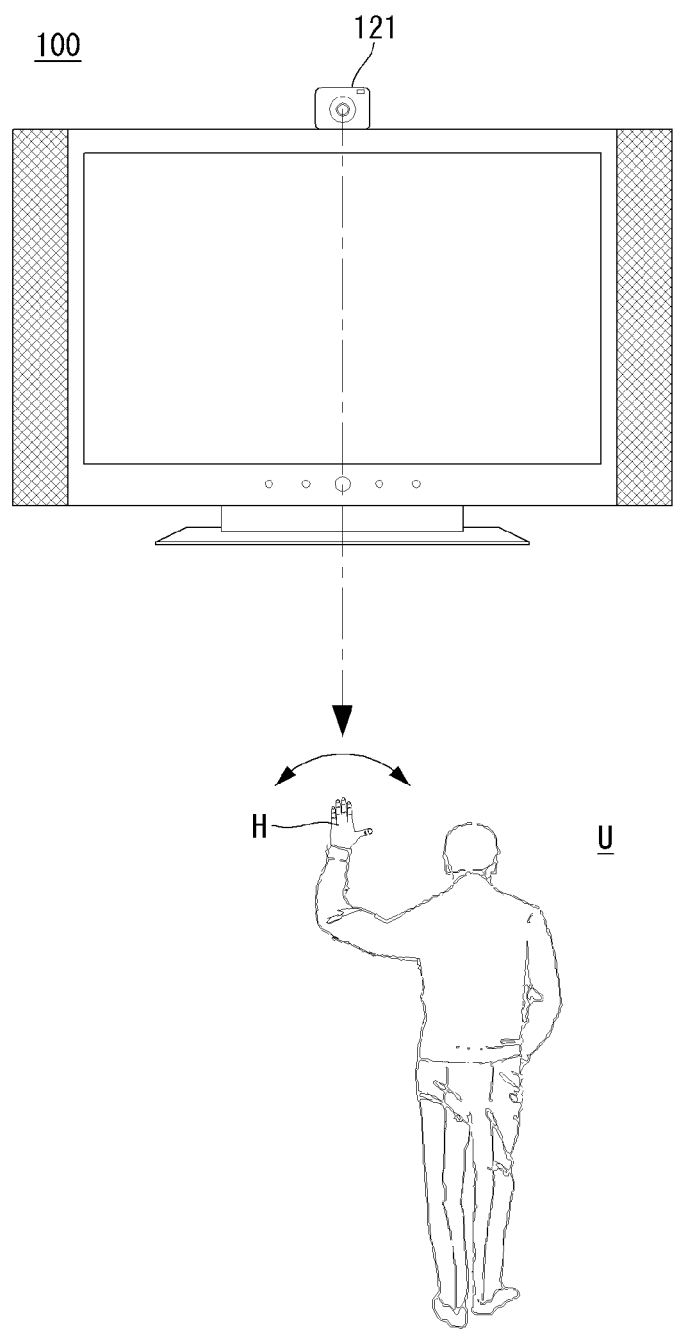
FIG. 2 illustrates an example where the display device of FIG. 1 is controlled by using the user's gesture.

FIG. 2 illustrates an example where the display device of FIG. 1 is controlled by using the user's gesture;

As shown in the figure, the control right for the display device 100 can be given to the user (U) if the user (U) attempts a particular motion. For example, if the user's (U) motion of raising and waving his or her hand (H) left and right is set as the motion for obtaining the control right, the user carrying out the motion can acquire the control right.

If a user with the control right is found, the controller 180 tracks the user. Authorizing and tracking the user can be carried out based on images captured through the camera prepared in the display device 100. In other words, it indicates that the controller 180 can continuously determine whether a particular user (U) exists by analyzing the captured images; whether the particular user (U) carries out a gesture required for obtaining the control right; and whether the particular user (U) carries out a particular gesture.

The particular gesture of the user can correspond to the motion for carrying out a particular function of the display device 100 or for stopping a particular function in execution. For example, the particular gesture can correspond to the motion of selecting various menus displayed in three-dimensional images by the display device 100.

Figure 3:
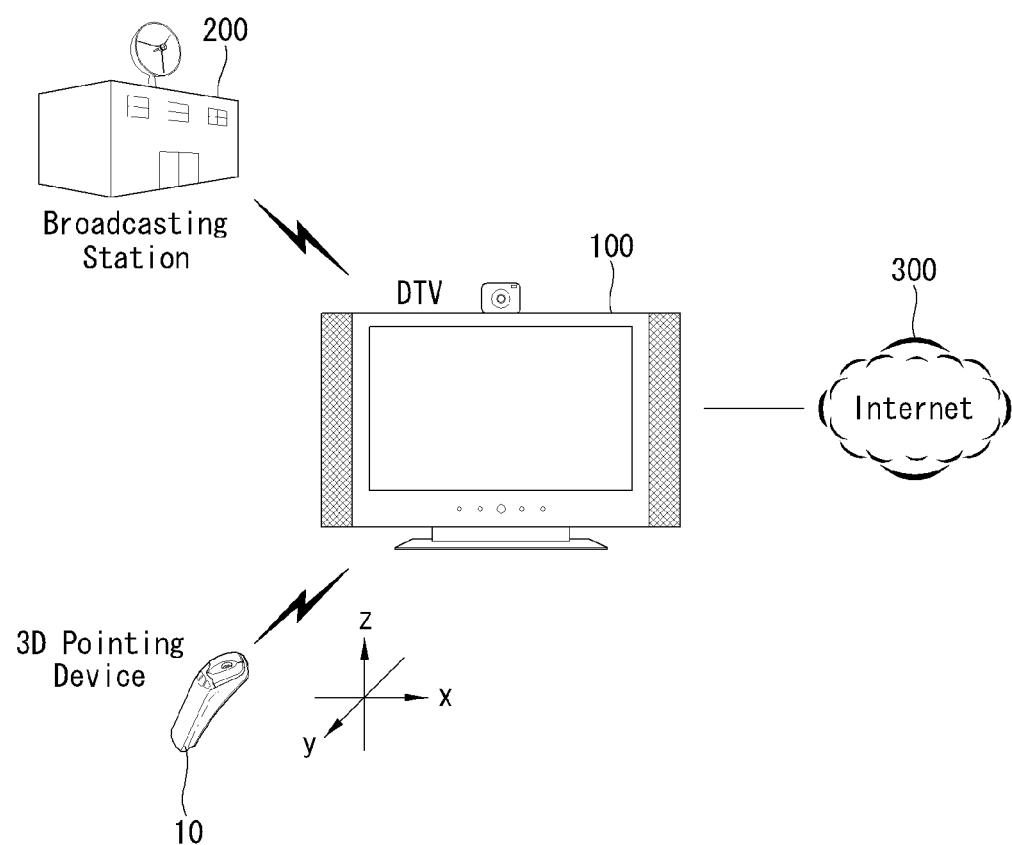
FIG. 3 illustrates an example where the display device of FIG. 1 is controlled by using a 3D pointing device.

FIG. 3 illustrates an example where the display device of FIG. 1 is controlled by using a 3D pointing device.

As shown in the figure, the display device 100 according to one embodiment of the present invention can be controlled by a three dimensional (3D) pointing device 10.

The 3D pointing device 10 detects a 3D motion and sends information about the 3D motion detected to the display device 100. The 3D motion can correspond to a command for controlling the display device 100. The user, by moving the 3D pointing device 10 in 3D space, can send a predetermined command to the display device 100. The 3D pointing device 10 can be equipped with various key buttons. By using the key buttons, the user can enter various commands.

The display device 100 can receive a broadcasting signal from a broadcasting station 200 and output the broadcasting signal. Also, the display device 100 can be equipped with a device capable of connecting to the Internet 300 according to TCP/IP (Transmission Control Protocol/Internet Protocol).

Figure 4:
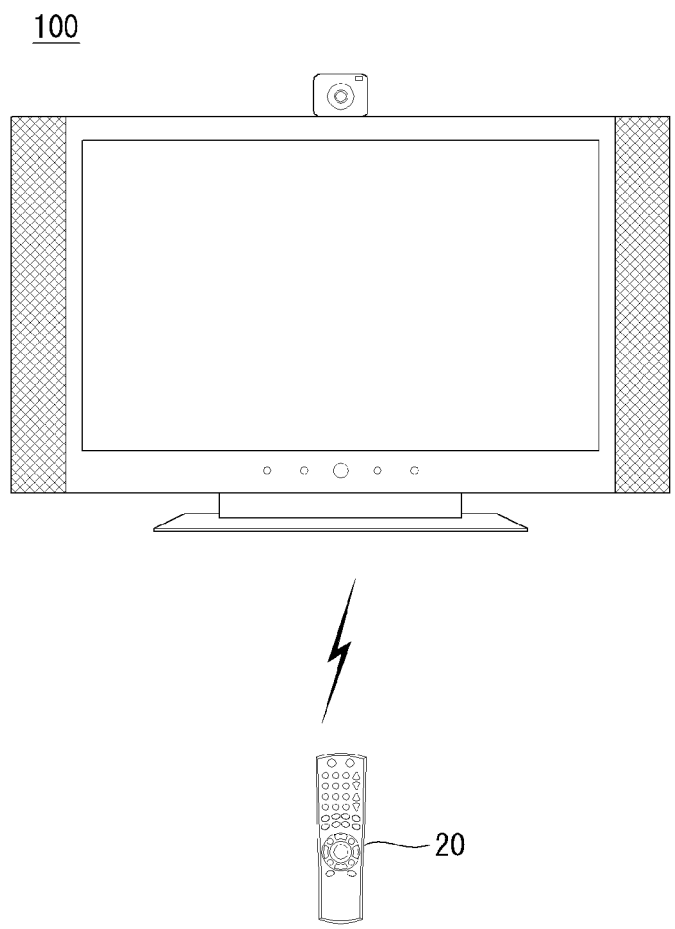
FIG. 4 illustrates an example where the display device of FIG. 1 is controlled by a remote controller.

FIG. 4 illustrates an example where the display device of FIG. 1 is controlled by a remote controller.

As shown in the figure, the display device 100 according to one embodiment of the present invention can be controlled by a remote controller 20.

The remote controller 20 can exchange data with the display device 100 based on IR (Infrared Ray) communication method. For example, if the user pushes a particular button of the remote controller 20, a corresponding infrared signal can be generated; and the display device 100 receiving the infrared signal can carry out a particular function.

Figure 5:
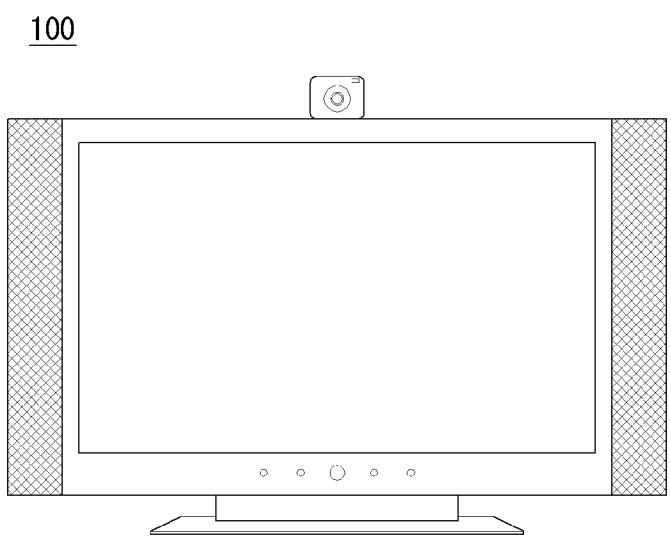
FIG. 5 illustrates an example where the display device of FIG. 1 is controlled by a mobile terminal.
Figure 5:
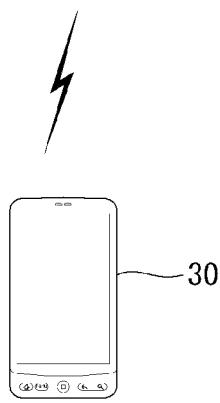

FIG. 5 illustrates an example where the display device of FIG. 1 is controlled by a mobile terminal.

As shown in the figure, the display device 100 according to one embodiment of the present invention can be controlled by a mobile terminal 30.

The mobile terminal 30 can be a smart phone capable of carrying out various functions. The mobile terminal 30, which is a smart phone, can control functions of the display device 100 through Bluetooth and IR communication.

Figure 6:
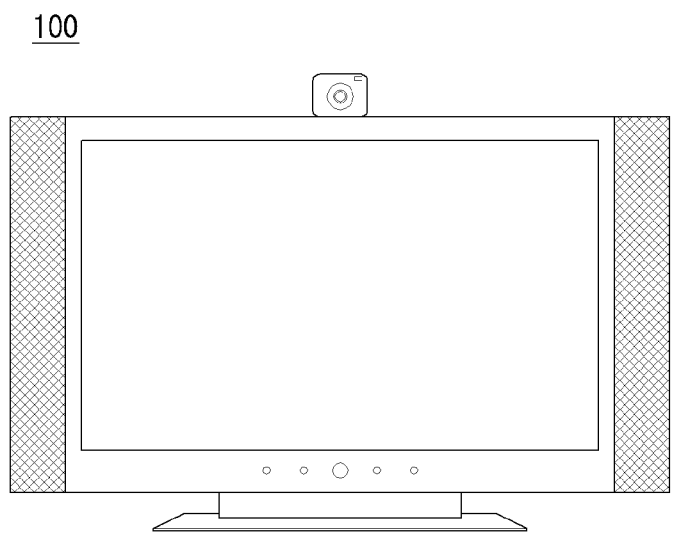
FIG. 6 illustrates an example where the display device of FIG. 1 is controlled by a voice.
Figure 6:
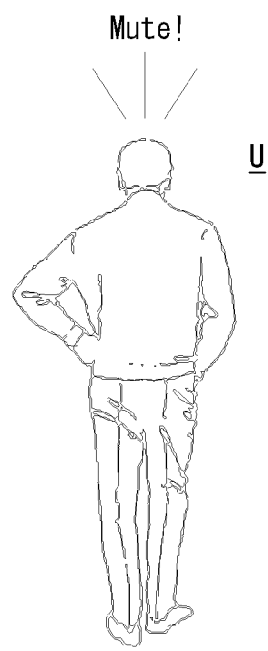

FIG. 6 illustrates an example where the display device of FIG. 1 is controlled by a voice.

As shown in the figure, the display device 100 according to one embodiment of the present invention can be controlled by using the user's voice as a control command. For example, if the user issues a command such as "mute" with his or her voice, the volume of the display device 100 can be decreased to produce no audible sound.

The user giving a control command with his or her voice has a control right for the display device 100. In other words, it implies that the display device 100 responds to a voice command issued by the user with the control right for the display device 100.

Figure 7:
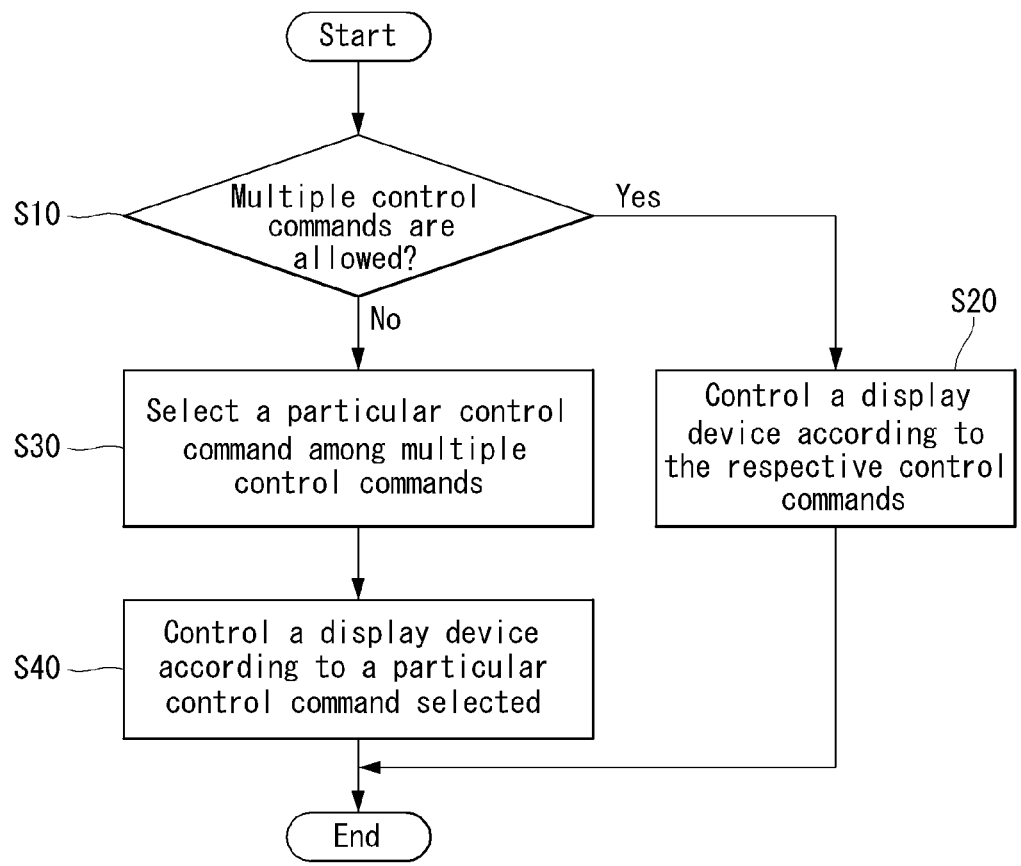
FIG. 7 is a flow chart illustrating the operation procedure of a display device according to one embodiment of the present invention.

FIG. 7 is a flow chart illustrating the operation procedure of a display device according to one embodiment of the present invention.

As shown in the figure, the controller 180 of the display device 100 according to one embodiment of the present invention can carry out the step S10 of determining whether multiple control commands are allowed.

A control command can carry out a particular function of the display device 100 or stop execution of a particular function. For example, a control command can be used for carrying out various functions required for the operation of the display device 100 such as adjusting the volume, changing channels, and selecting a menu of the display device 100.

A control command can be generated by a particular user watching the display device 100. For example, if the user carries out a particular gesture motion, operates a remote controller 20, or carries out a particular voice command, a particular control command corresponding to the above can be generated.

The controller 180 can determine whether multiple control commands are allowed or not. In other words, the controller 180 can determine whether the display device 100 is in the situation where two or more control commands are handled simultaneously. The situation where multiple control commands are allowed can correspond to the case where multiple users are trying to control the display device 100 as described below. For example, while a first control command is input as a first user carries out a particular gesture motion, a second user can operate the remote controller 20 inputting a second control command.

Whether multiple control commands are allowed depends on a current state of the display device 100. For example, if the display device 100 is currently in a state A, the first control command can be a control command which can be applied only for the state A. On the other hand, the second control command can correspond to a control command for changing the state A into a state B or a control command which can be applied when the display device 100 stays in a state C. In this case, the second control command cannot be carried out while the first control command is carried out. In other words, the above situation implies that the display device 100 is not in a state where multiple control commands are allowed.

If the display device 100 is in a state where multiple control commands are allowed, a step S20 of controlling the display device 100 according to the respective control commands can be carried out.

As described above, the situation where multiple control commands are allowed for the display device 100 can correspond to the case where the display device 100 still operates properly even when all of input multiple control commands are allowed. For example, while a first control command selecting a menu by using a gesture motion is being input, a second control command for adjusting a volume by using the remote control 20 can be received.

When multiple control commands are allowed, the controller 180 can control the display device 100 according to the respective control commands. For example, in the case of the aforementioned first and second control command, a volume can be adjusted according to the second control command at the same time a menu is selected according to the first control command.

If multiple control commands are not allowed, a step S30 of selecting a particular control command from among multiple control commands and a step S40 of controlling the display device 100 according to the particular control command selected can be carried out.

In some cases, the display device 100 allows only one control command depending on the current situation. For example, the display device 100 can stay in a state where a menu is selected with a hovering cursor according to the first control command corresponding to the gesture motion of the first user. In this case, if the second user attempts hovering of the cursor by using the 3D pointing device 10, the controller 180 can determine that multiple control commands are not allowed.

If multiple control commands are received while the display device 100 is in a state where multiple control commands are not allowed, the controller 180 can determine which control command is to be used from the multiple control commands to control the display device 100. The control command selected to control the display device 100 from the multiple control commands can be determined by various criteria; the criteria will be described in detail in the corresponding part of this document.

FIGS. 8 to 11 are examples where multiple control commands are carried out at the display device of FIG. 7.

As shown in the figure, the controller 180 of the display device 100 according to one embodiment of the present invention can control the display device 100 based on multiple control commands input from the user.

Figure 8:
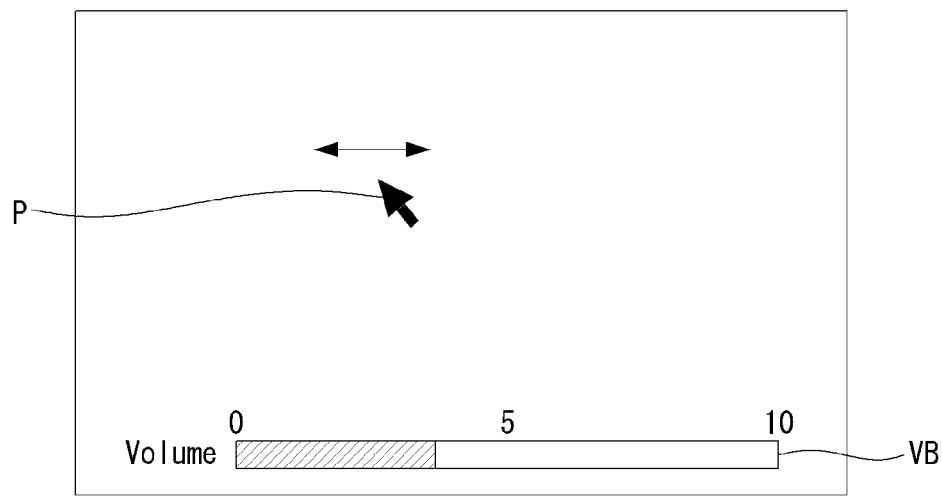
Figure 8:
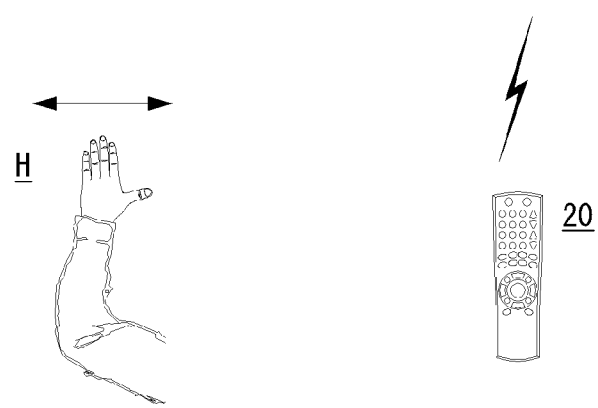

As shown in FIG. 8, the user can perform a gesture motion by using his or her hand (H). The gesture motion by the hand (H) can correspond to a control command for hovering of a pointer (P) displayed on the display 151. In other words, the pointer (P) can move in accordance to the gesture motion taken by the user. The user can carry out the operation desired such as selection of a menu by hovering of the pointer (P).

While the user performing a gesture motion by hand (H), the user or another user can carry out the operation of adjusting a volume by using the remote controller 20. The adjustment of the volume can correspond to a control command not conflicting against hovering of the pointer (P) corresponding to the gesture motion by the hand (H). In other words, hovering of the pointer (P) and adjustment of the volume can be carried out independently from each other.

The controller 180 can process multiple control operations simultaneously as far as the operations do not interfere with each other.

Figure 9:
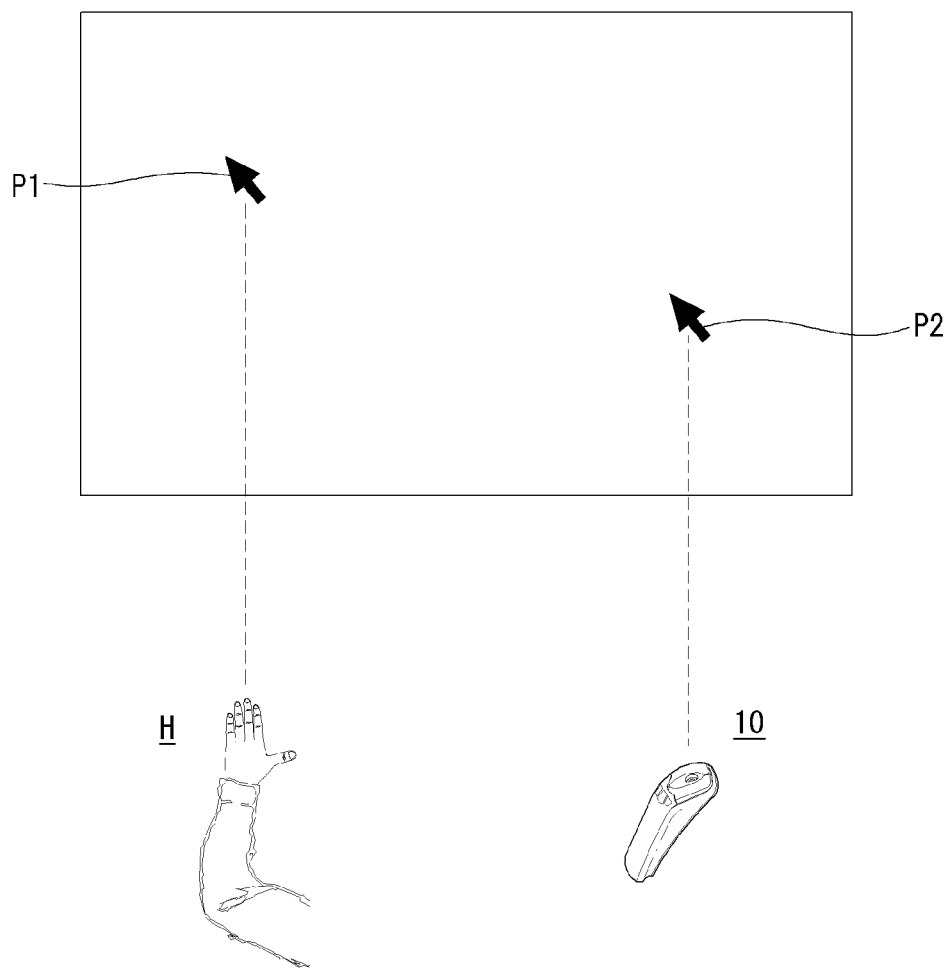

As shown in FIG. 9, a first pointer (P1) and a second pointer (P2) can be displayed simultaneously on the display 151.

The first pointer (P1) can hover around according to the gesture motion of the user's hand (H) while the second pointer (P2) according to the motion of the 3D pointing device 10. That means the pointers P1, P2 can be controlled by the respective control commands. Since the pointers P1, P2 are controlled by the respective control commands, the first control command due to the gesture motion of hand (H) and the second control command due to the 3D pointing device 10 can avoid conflict during operation. Therefore, the controller 180 can carry out the two control operations simultaneously.

Figure 10:
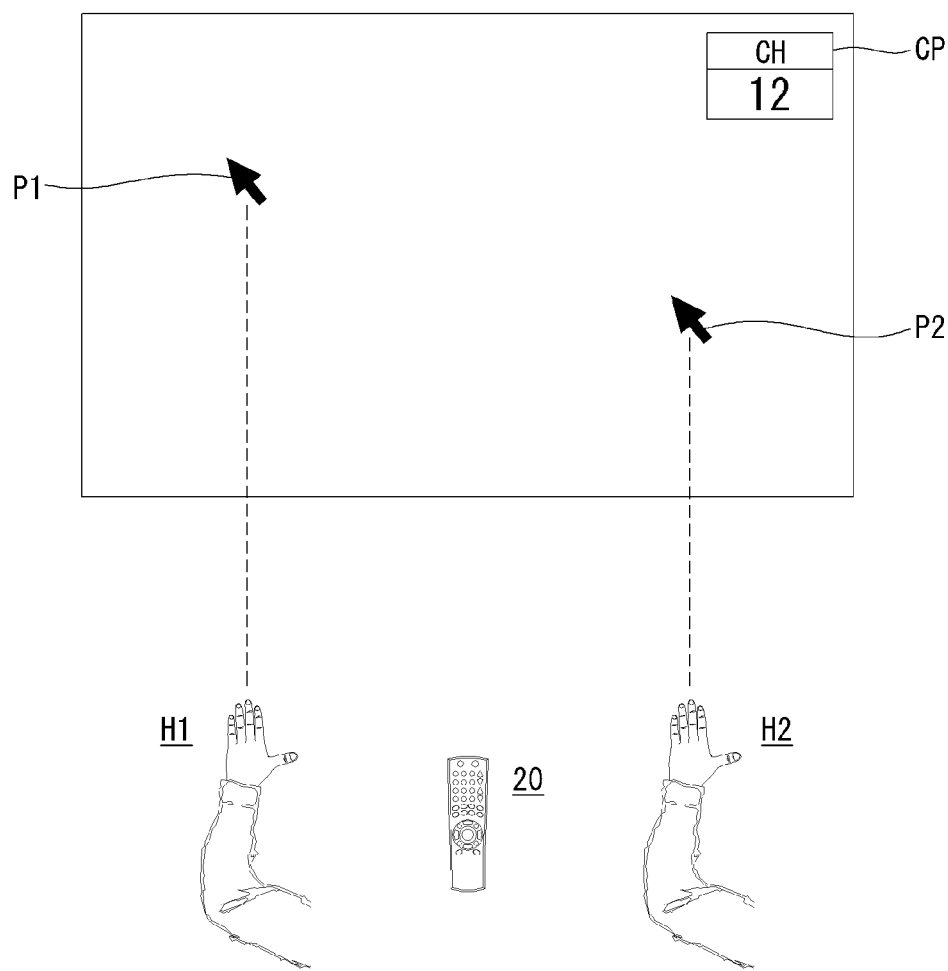

As shown in FIG. 10, gesture motions by using a first and a second hand H1, H2 of one or two users can be carried out. According to the gesture motions carried out by the first and the second hand H1, H2, the first and the second pointer P1, P2 can perform hovering correspondingly. Since each of the pointers P1, P2 correspond to a control command due to the respective gesture motions, the controller 180 can carry out the two control operations at the same time.

While gesture motions due to the first and the second hand H1, H2 are carried out, a control command for changing channels by using the remote controller 20 can be additionally received. In response to the control command for changing channels by using the remote controller 20, the controller 180 can display a channel change pop-up window (CP). The user can select a channel that he or she wants while watching the channel change pop-up window (CP) displayed.

The controller 180 can carry out the first and the second control command corresponding to the gesture motions due to the first and the second hand H1, H2; and operation corresponding to a third control command due to the remote controller 20. In other words, since the first, the second, and the third control command are those not interfering with each other, channels can be changed based on the third control command while the first and the second pointer P1, P2 are hovering around based on the first and the second control command.

As shown in FIG. 11, predetermined can be a set of control commands which can be carried out simultaneously since they do not interfere with each other.

As shown in FIG. 11(a), a first function of hovering of a cursor or a pointer can be carried out simultaneously with a second function of adjusting a volume, changing a channel, or suppressing sound level. For example, even when a pointer is hovering due to the gesture motion of the user, adjusting a volume can be made possible.

As shown in FIG. 11(b), a first function of adjusting a volume and a second function of changing channels can be carried out at the same time.

Figure 12:
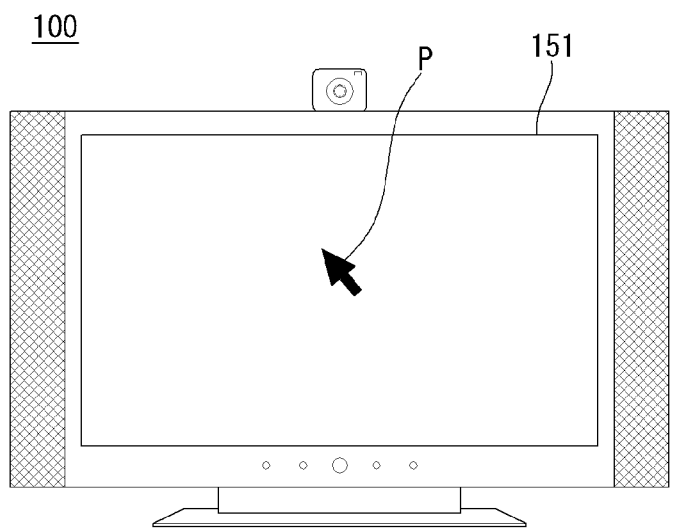
Figure 12:
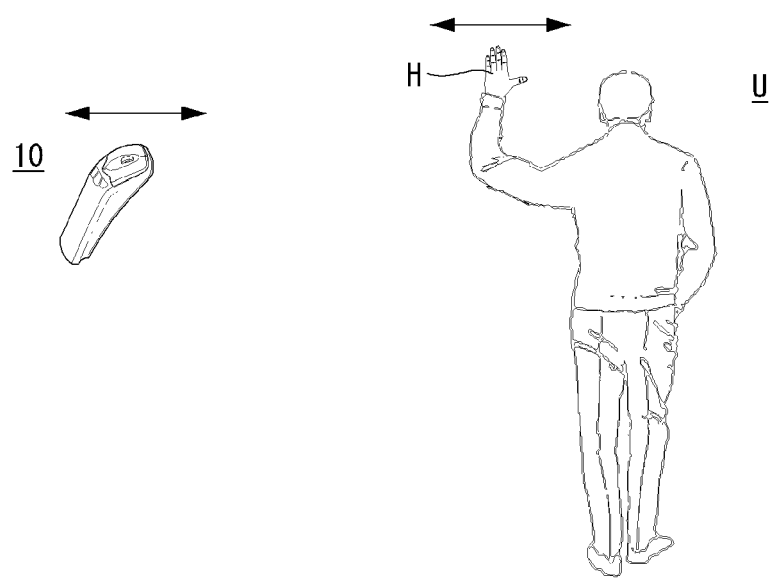

FIGS. 12 and 13 are examples where one of multiple control commands is carried out at the display device of FIG. 7.

As shown in the figures, the display device 100 according to one embodiment of the present invention can select a particular control command based on a predetermined criterion from among multiple control commands received simultaneously.

As shown in FIG. 12, a single pointer P can be displayed on the display 151. The controller 180 can make the pointer (P) hover around based on the input control command.

In a setting where there is only a single pointer (P), a first control command based on the 3D pointing device 10 and a second control command based on the gesture by the user (U)'s hand (H) can be received at the same time. In other words, the first and the second command attempting to make the pointer (P) hover around can be input simultaneously.

The controller 180, if control commands not executable simultaneously are input, a particular control command from the two can be selected based on a predetermined criterion and the display device 100 can be controlled based on the selected control command.

As shown in FIG. 13, the controller 180 can select a particular control command from multiple control commands based on a predetermined criterion.

As shown in FIG. 13(a), a first function for hovering of a cursor or a pointer can be so set that it cannot be used simultaneously with a second function of changing the depth of a hierarchical menu or selecting a particular menu. For example, when a menu selected by a gesture motion is activated, a control command for selecting a menu by using the 3D pointing device 10 may not be carried out.

As shown in FIG. 13(b), if the first and the second function corresponding to input multiple control commands correspond to multiple control signals for the same object, the multiple control commands may not be carried out simultaneously. For example, a control command for selecting a particular menu simultaneously with a gesture motion and the 3D pointing device 10 cannot be accepted.

The controller 180 can select a particular control command from input multiple control commands based on a set of control commands as described above.

FIGS. 14 to 18 are examples where a control command with a high priority among multiple control commands is carried out at the display device of FIG. 7.

As shown in FIG. 14, there can be a criterion to carry out which control command from among input multiple control commands. In other words, priorities can be given to the respective control commands. For example, priorities can be assigned in the order of a control command due to a gesture motion, a control command due to a voice, a control command due to a 3D pointing device, a control command due to an infrared remote controller, and a control command due to a smart phone.

The controller 180 can carry out a control command based on a predetermined priority. For example, if a control command due to a gesture motion is generated while control of operation by using a 3D pointing device is carried out, the display device 100 can be controlled according to the control command due to the gesture motion. In the same reason, although a control command due to a smart phone is generated while control of operation by using the 3D pointing device is carried out, the control command due to the smart phone can be ignored.

Figure 15:
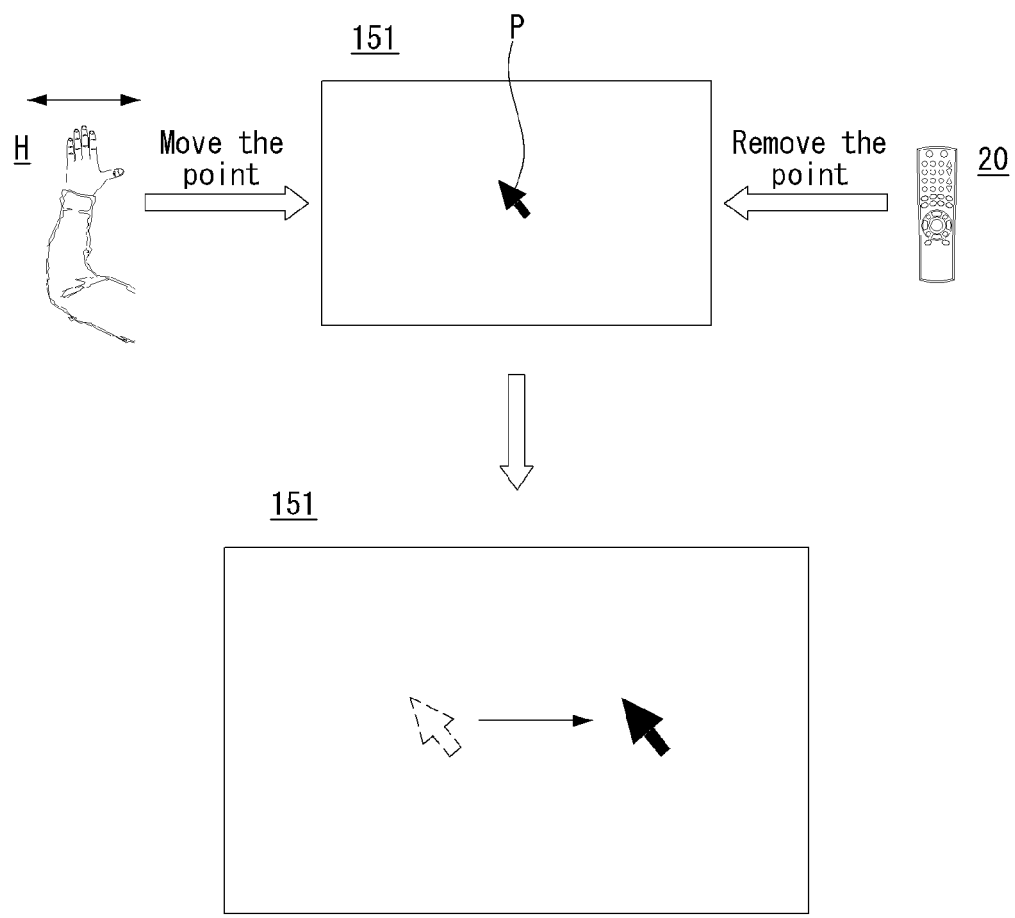
Figure 16:
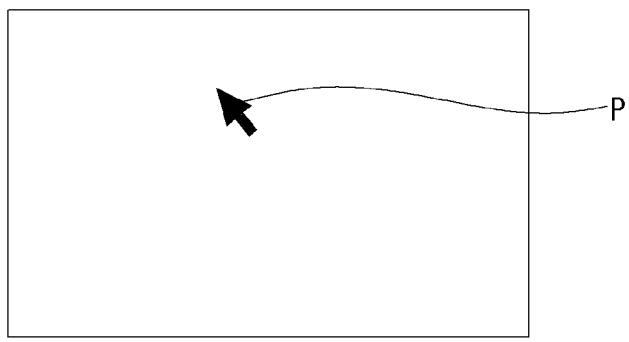
Figure 16:
Figure 16:
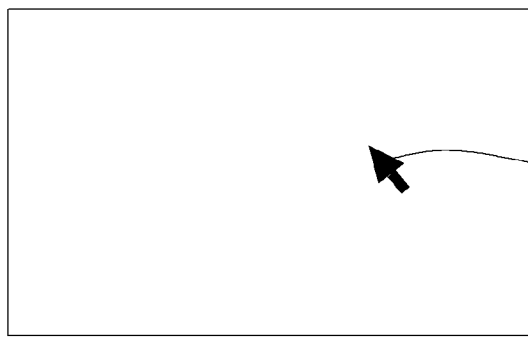
Figure 16:
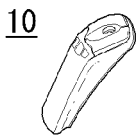
Figure 16:
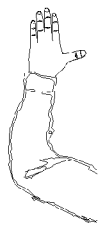

As shown in FIG. 15, a single pointer (P) can be displayed on the display 151. While a single pointer (P) is displayed, a first control command due to the gesture of the user's hand (H) for controlling the pointer (P) and a second control command due to the remote controller 20 can be received simultaneously.

The controller 180 can utilize a predetermined priority for selecting a control command to control the pointer (P) from the first and the second control command received simultaneously. In other words, the pointer (P) can be controlled based on the gesture motion with a higher priority than that of the remote controller 20.

As shown in FIG. 16(a), a single pointer (P) displayed on the display 151 can be under control by the 3D pointing device 10.

As shown in FIG. 16(b), a control command due to the gesture motion from a hand (H) can be received while the pointer (P) is controlled based on a control command by using the 3D pointing device 10.

Figure 17:
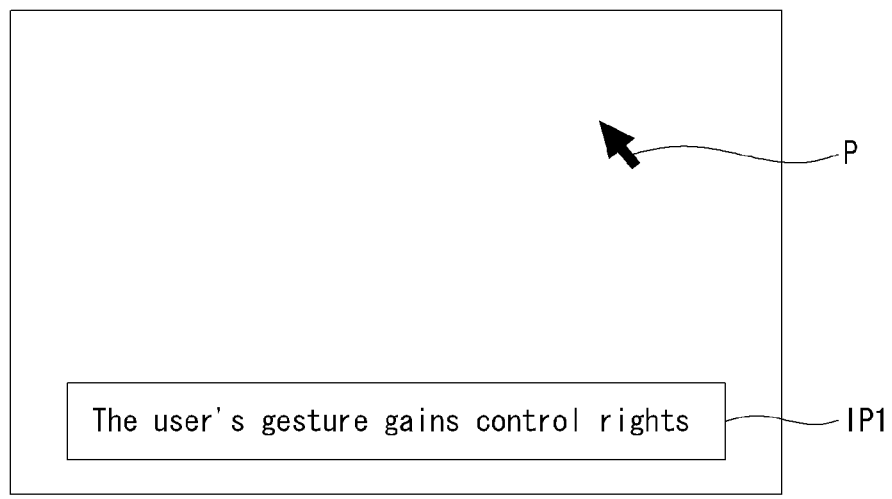
Figure 17:
Figure 17:
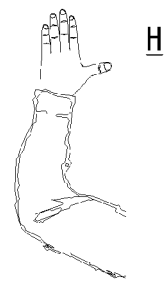

As shown in FIG. 17, if a control command based on the gesture motion from hand (H) is newly received, the controller 180 can make the pointer (P) operate according to the control command based on the gesture motion. Also, the controller 180 can display a first information window IP1 on the display 151, the first information window IP1 notifying that the control method has been changed.

Figure 18:
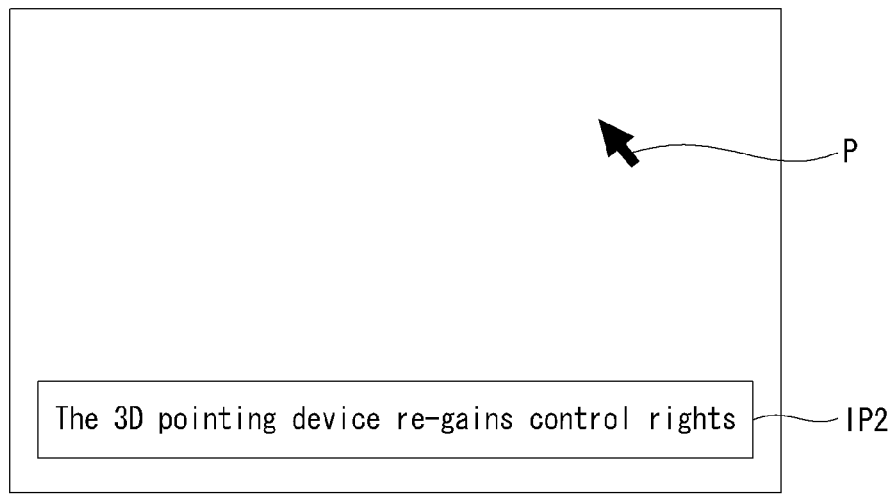
Figure 18:
Figure 18:
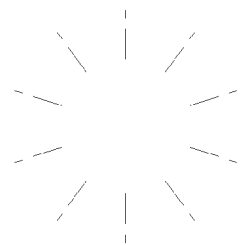

As shown in FIG. 18, the hand (H) controlling the pointer (P) may disappear. If the hand (H) disappears, the 3D pointing device 10 can again control the pointer (P). Also, the controller can display a second information window IP2 on the display 151 that the control method has been changed.

Figure 19:
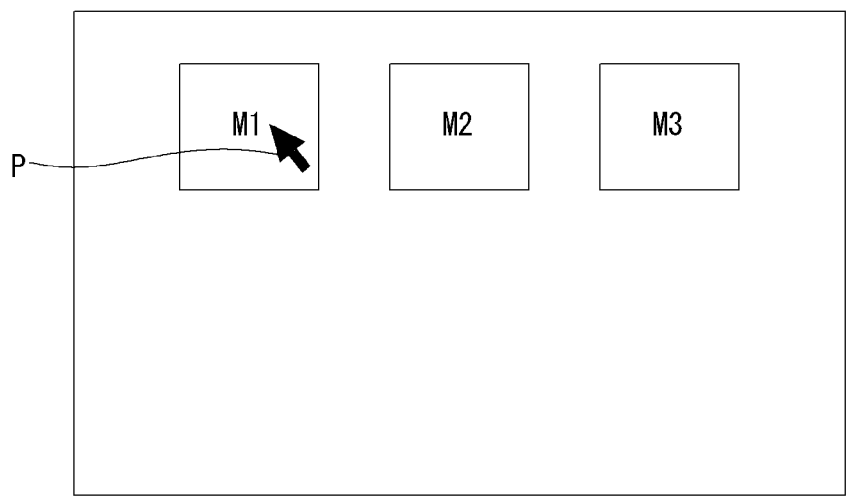
FIGS. 19 and 20 are examples where a control command with a low priority among multiple control commands is carried out at the display device of FIG. 7.
Figure 19:
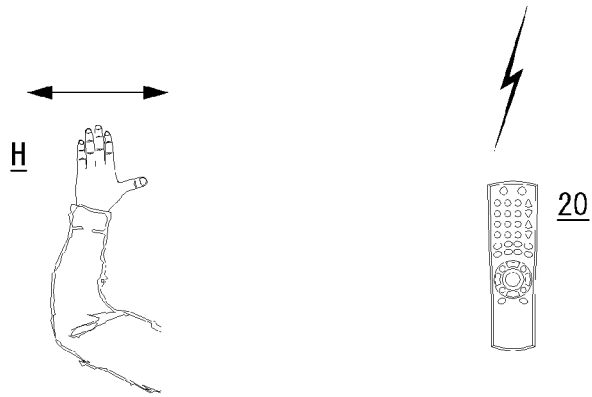
Figure 20:
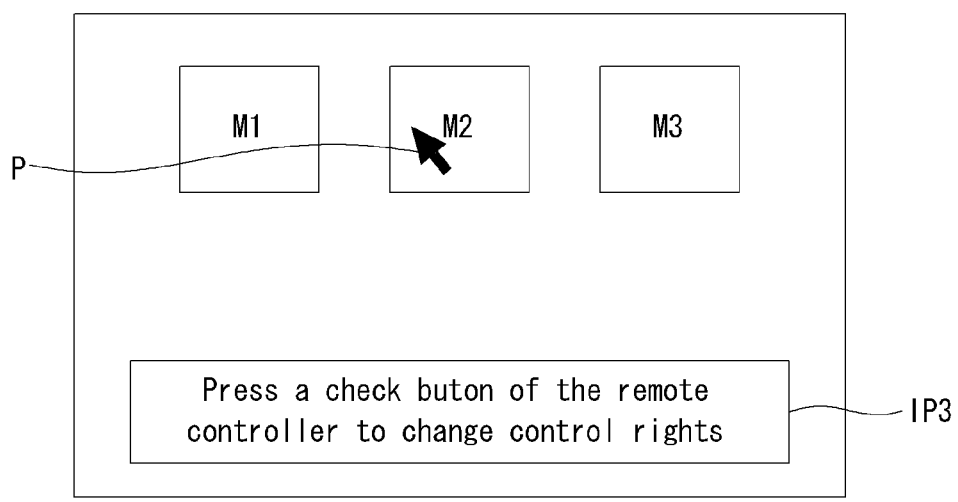
Figure 20:
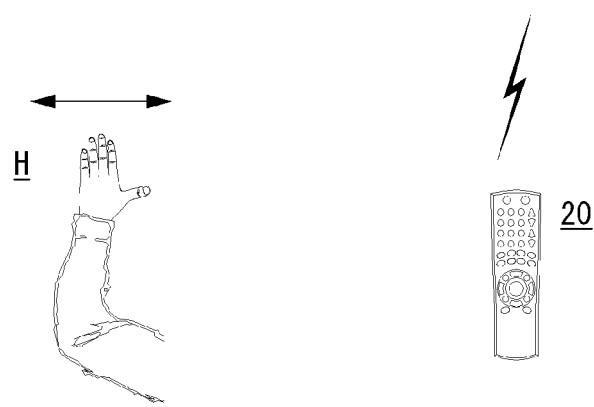

FIGS. 19 and 20 are examples where a control command with a low priority among multiple control commands is carried out at the display device of FIG. 7.

As shown in the figures, the display device 100 according to one embodiment of the present invention can be controlled by a particular means irrespective of a predetermined priority.

It is assumed in FIG. 19 that the pointer (P) is hovering according to the gesture motion of a hand (H). While the pointer (P) is hovering around according to the gesture motion, a control command can be received from the remote controller 20. Considering the predetermined priority, the control command from the remote controller 20 can be ignored.

As shown in FIG. 20, the controller 180 can temporarily ignore a control command from the remote controller 20. However, it should be noted that the controller 180 can display a third information window IP3; in this case, the third information window IP3 notifies that the remote controller 20 should be additionally operated in order to control the display device 100 by using the remote controller 20. For example, specific information provided by the third information window IP3 can indicate that if the user pushes a particular button of the remote controller 20, the control initiative for controlling the pointer (P) displayed can be taken over by the remote controller 20.

Figure 21:
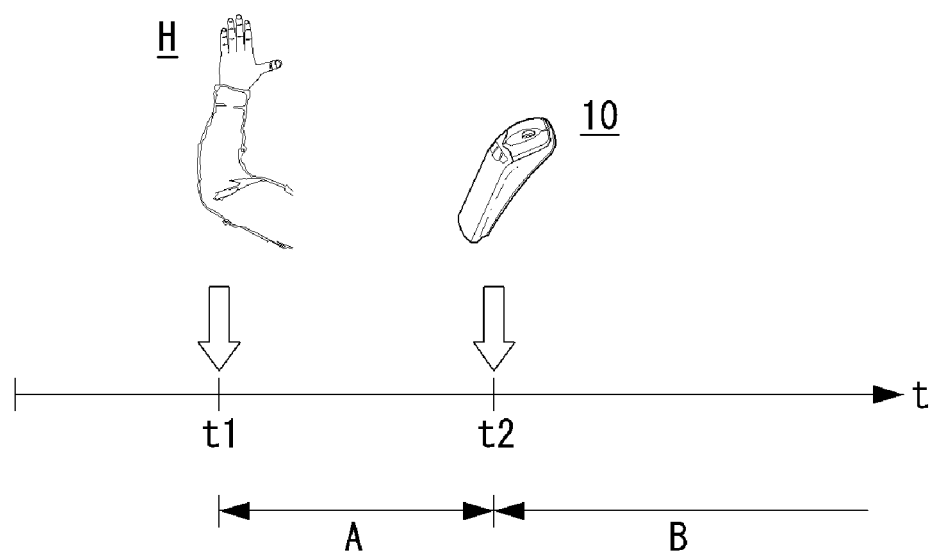
FIG. 21 is an example where control commands are carried out sequentially according to the order of command input at the display device of FIG. 7.

FIG. 21 is an example where control commands are carried out sequentially according to the order of command input at the display device of FIG. 7.

As shown in the figure, the controller 180 of the display device 100 according to one embodiment of the present invention can determine whether to allow control authority for the display device 100 based on the time order.

A control command by using a hand (H) can be received at the time point of t1; since that time, only the control command due to the hand (H) can be allowed for the time duration of A.

Now, a control command by using the 3D pointing device 10 can be received at the time point of t2.

The controller 180 can ignore the control command by using the 3D pointing device 10 received at the time point of t2. In other words, it implies that a control command coming from a different means can be ignored before the previous control command from the hand (H) is stopped. Therefore, the control command from the hand (H) can still be received for the time duration of B as well as the time duration of A.

Figure 22:
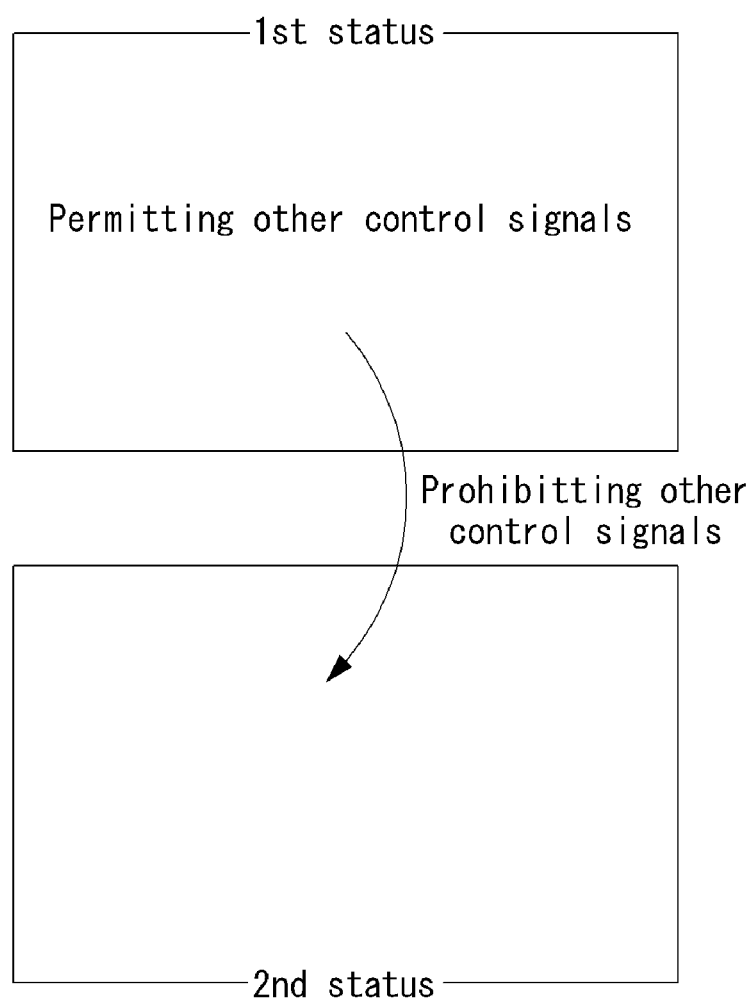
FIG. 22 is an example where multiple control commands are carried out at the display device of FIG. 7.

FIG. 22 is an example where multiple control commands are carried out at the display device of FIG. 7.

As shown in the figure, which control command to choose among multiple control commands for the display device 100 according to one embodiment of the present invention can be determined based on whether the control command is intended for changing the state of the display device 100.

The display device 100 may stay in a first state. For example, the state of the display device 100 can be such that a menu is selected while it is being displayed. In the first state, the display device 100 can be controlled based on a first control command due to a particular first means.

While the first control command due to the first means is received, a second control command due to a second means can be received.

The controller 180 can determine whether the second control command is intended for changing the state of the display device 100. In other words, the controller 180 can determine whether the current first state is going to be changed to a different second state.

If it is the case that the current first state is not changed to another one, the controller 180 can allow the second control command. In other words, the display device 100 can be controlled by the second control command as well as by the first control command.

If it is the case that the first state is going to be changed to the second state, the controller 180 may not allow the second control command. In other words, it means that the display device 100 is controlled only by the first control command.

Figure 23:
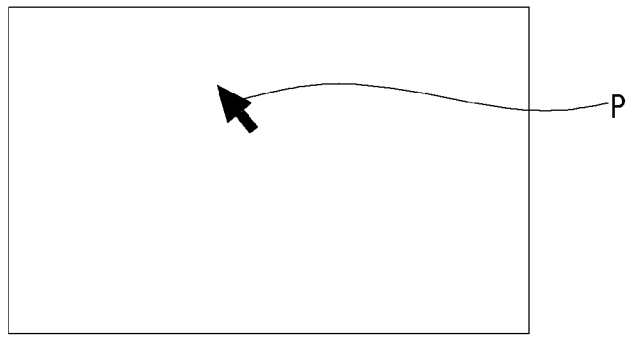
FIGS. 23 and 24 illustrate examples where the display device of FIG. 7 communicates with a mobile terminal.
Figure 23:
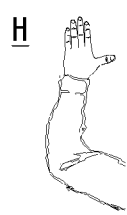
Figure 23:
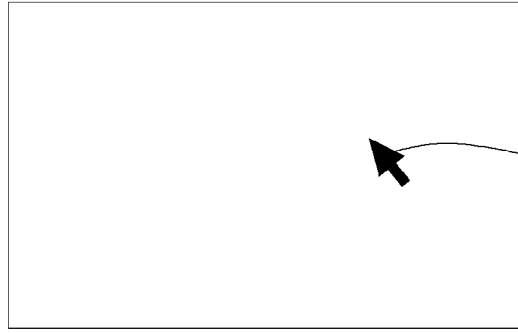
Figure 23:
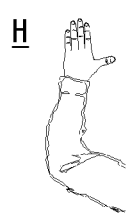
Figure 23:
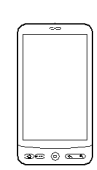
Figure 24:
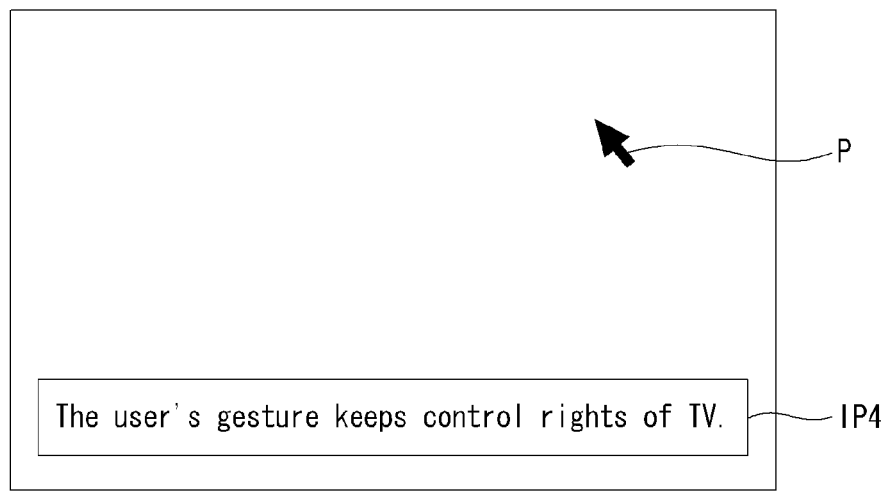
Figure 24:
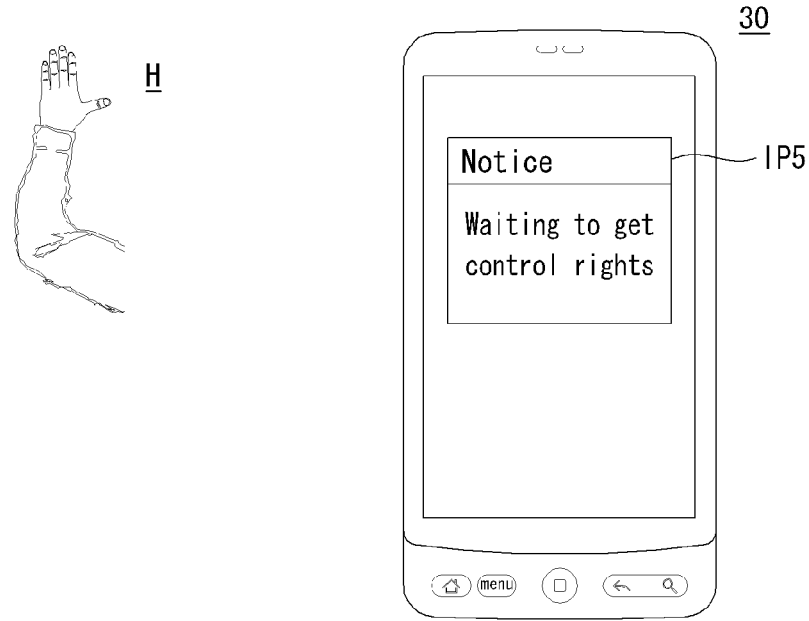

FIGS. 23 and 24 illustrate examples where the display device of FIG. 7 communicates with a mobile terminal.

As shown in the figure, the display device 100 according to one embodiment of the present invention can communicate information about a current state with a mobile terminal 30.

As shown in FIG. 23(*a*), a gesture motion by using the user's hand (H) can be carried out. According to the gesture motion, control for the pointer (P) can be carried out.

As shown in FIG. 23(*b*), a control command through the mobile terminal 30 can be received while a first control command from the gesture motion is received.

As shown in FIG. 24, if a control command by using the mobile terminal with a relatively low priority is received while the gesture motion from the hand (H) with a relatively high priority is received, the controller 180 can make the pointer (P) operate based on the gesture motion.

The controller 180 can display information on a fourth information window IP4 of the display 151, the information indicating that the control right still belongs to the gesture motion. Also, by communicating with the mobile terminal 30, information related to the display of the mobile terminal 30 can be displayed in the form of a fifth information window IP5. As the fifth information window IP5 is displayed on the mobile terminal 30, the user of the mobile terminal 30 can easily recognize that acquisition of the control right through the mobile terminal 30 has been failed.

Figure 25:
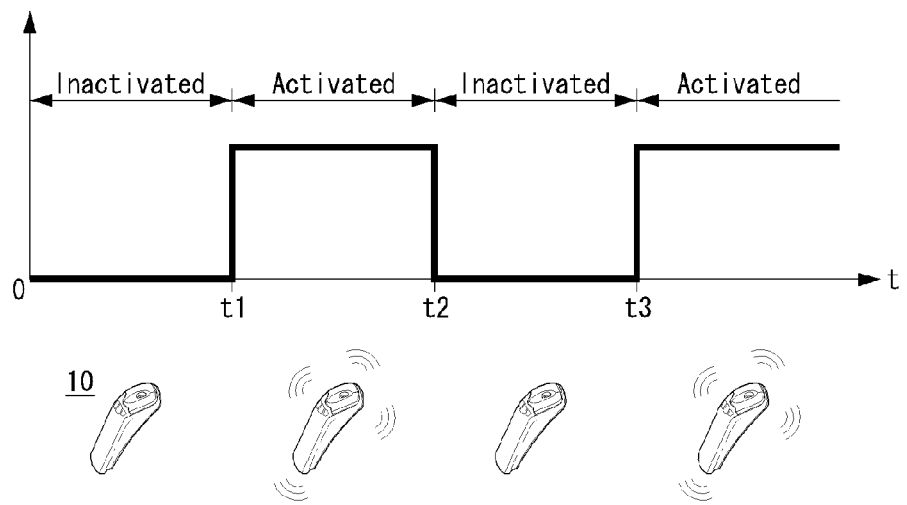
FIGS. 25 and 26 illustrate the motion of a 3D pointing device which can deliver a control command to the display device of FIG. 7.
Figure 26:
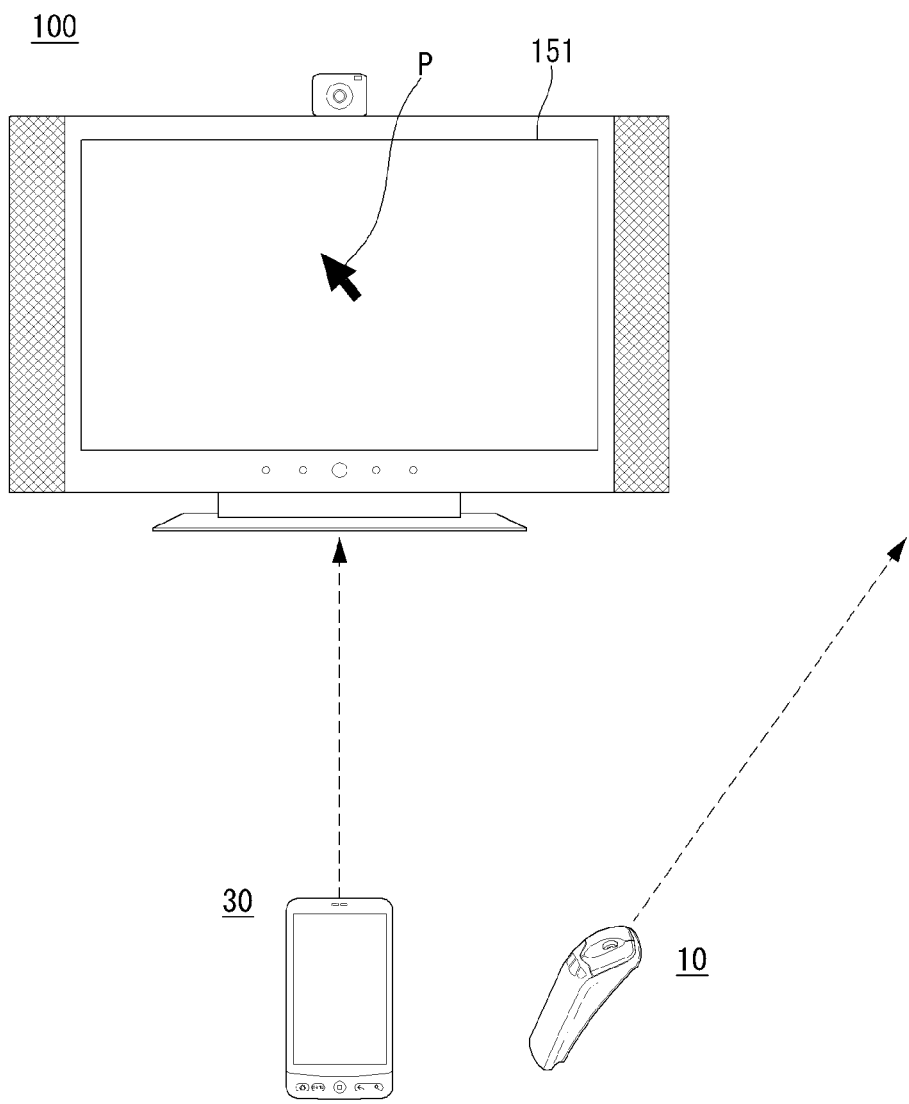

FIGS. 25 and 26 illustrate the motion of a 3D pointing device which can deliver a control command to the display device of FIG. 7.

As shown in the figure, the controller 180 of the display device 100 according to one embodiment of the present invention can make the control state about the display device 100 varied according to the state of a control means for the display device 100.

As shown in FIG. 25, the 3D pointing device 30 delivering a control command to the display device 100 can stay in an inactive or active state.

The user may have not touched the 3D pointing device 30 until the time point of t1. Whether the 3D pointing device 30 has been touched can be detected by using a built-in motion sensor of the 3D pointing device 30. For example, if the user touches the 3D pointing device 30 to operate the 3D pointing device, the corresponding motion can be detected by the motion sensor.

The user can touch the 3D pointing device 30 between the time points of t1 and t2. In other words, the above situation means that the user moves while holding the 3D pointing device 30 to control the display device 100. If a touch for the 3D pointing device 30 is detected, the 3D pointing device 30 can enter the active state. In the active state, control of the display device 100 by using the 3D pointing device 30 can be made possible.

Since activation of the 3D pointing device 30 is determined according to the actual use of the 3D pointing device 30, power consumed inside the 3D pointing device 30 can be minimized.

Whether to activate the 3D pointing device 30 can be determined by the value sensed by a grip sensor located on the surface of the 3D pointing device 30. The grip sensor may take the form of a button. If the user grabs the 3D pointing device 30 to use it, the grip sensor can detect the intention of the user. If the grip sensor detects grabbing of the user, the 3D pointing device 30 can be activated.

As shown in FIG. 26, the display 151 can display a pointer (P). The pointer (P) displayed on the display 151 can be controlled by the mobile terminal 30 directed toward the display 151. In other words, a device actually controlling the pointer (P) is the means which is directed toward the display 151.

Even when the 3D pointing device 10 is positioned in front of the display device 100 together with the mobile terminal 30, if the aiming direction of the 3D pointing device does not coincide with the direction along which the display device 100 is positioned, the controller 180 can ignore the control command from the 3D pointing device 10.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device readable by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed among networked computer systems so that the computer readable codes are stored and executed in a distributed fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided for controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc. means that a particular feature, structure, or characteristic described in connection with the embodiment is included in at least one embodiment of the invention. The appearance of such phrases in various places in the specification does not necessarily refer to the same embodiment. Further, when a particular feature, structure, or characteristic is described in connection with any embodiment, it is assumed to fall within the purview of those skilled in the art to affect such feature, structure, or characteristic in connection with other ones of the embodiments.

Although the present invention has been described with reference to a number of illustrative embodiments thereof, it should be understood that numerous other modifications and embodiments can be devised by those skilled in the art, which fall within the spirit and scope of the principles of this disclosure. More particularly, variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device, comprising:
sensing units comprising at least two among a microphone detecting a user's voice, a camera detecting the user's gesture motion, and a communication unit detecting a communication signal of at least one external device and configured to detect multiple control commands; and
a controller configured to:
receive the multiple control commands through the sensing units, the multiple control commands being detected from different sensing units;
determine whether the received multiple control commands are compatible based on a current state of the device and a predetermined sets of control commands;
simultaneously execute multiple functions corresponding to the multiple control commands when the multiple control commands are compatible; and
selectively execute one function corresponding to a control command selected from the multiple control commands according to a predetermined criterion when the multiple control commands are incompatible,
wherein the multiple control commands include a first control command detected through a first sensing unit and a second control command detected through a second sensing unit, the second sensing unit being different from the first sensing unit, and
wherein the multiple functions are independent each other.

2. The device of claim 1, wherein the controller determines that the first control command and the second control command cannot be carried out simultaneously when a display state indicating control operation due to the first control command is changed as a control signal due to the second control command is generated.

3. The device of claim 1, wherein the controller determines that the first control command and the second control command cannot be carried out simultaneously when the particular control command corresponds to at least one of a hovering control command for pointers indicating the first control command and the second control command;
a control command for changing a menu hierarchy displayed;
a control command for selecting a displayed menu; and
a control command for selecting the same object.

4. The device of claim 1, wherein the communication unit detects at least one from among a communication signal from a 3D pointing device detecting a motion in 3D space, a communication signal from an infrared ray-based remote controller, and a communication signal from a mobile terminal.

5. The device of claim 1, wherein the predetermined criterion is determined according to a priority of an entity which generates the first control command and the second control command.

6. The device of claim 5, wherein the entity which generates the first control command and the second control command corresponds to at least one among a user's gesture motion, the user's voice, a 3D pointing device, an infrared remote controller, and a mobile terminal.

7. The device of claim 1, wherein the controller generates the display signal based on the second control command when receiving of the first control command is suspended while the second control command is received.

8. The device of claim 1, wherein the predetermined criterion is determined based on a time point at which the first control command and second control command are generated.

9. The device of claim 1, wherein the predetermined criterion is determined based on whether an entity which generates the first control command and the second control command is directed toward the device's position.

10. The device of claim 1, wherein the first control command is a control command for selecting a menu and the second control command is a control command for adjusting a volume, and
wherein the controller simultaneously executes two functions to select the menu and to adjust the volume when the controller determine that both the first control command and the second command are compatible.

11. The device of claim 1, wherein the first control command is a control command for hovering of a pointer and the second control command is a control command for adjusting a volume, and
wherein the controller simultaneously executes two functions for the pointer to hover over a screen and to adjust the volume when the controller determine that both the first control command and the second command are compatible.

12. A device, comprising:
sensing units comprising at least two among a microphone detecting a user's voice, a camera detecting the user's gesture motion, and a communication unit detecting a communication signal of at least one external device and configured to detect multiple control commands;
the communication unit comprising at least one of a wireless communication module and a wired communication module; and
a controller configured to:
  receive the multiple control commands through the sensing units, the multiple control commands being detected from different sensing units;
  determine whether the received multiple control commands are compatible based on a current state of the device and a predetermined sets of control commands;
  simultaneously execute multiple functions corresponding to the multiple control commands when the multiple control commands are compatible; and
  selectively execute one function corresponding to a control command selected from the multiple control commands according to a predetermined criterion when the multiple control commands are incompatible,
  wherein the multiple control commands include a first control command detected through a first sensing unit and a second control command detected through a second sensing unit, the second sensing unit being different from the first sensing unit, and
  wherein the multiple functions are independent each other.

13. The device of claim 12, wherein the communication unit detects at least one from among a communication signal from a 3D pointing device detecting a motion in 3D space, a communication signal from an infrared ray-based remote controller, and a communication signal from a mobile terminal.

14. The device of claim 12, wherein the predetermined criterion is determined according to a priority of an entity which generates the first control command and the second control command.

15. A method for controlling a device, comprising:
receiving multiple control commands through the sensing units, the multiple control commands being detected from different sensing units;
determining whether the received multiple control commands are compatible based on a current state of the device and a predetermined sets of control commands;
simultaneously executing multiple functions corresponding to the multiple control commands when the multiple control commands are compatible; and
selectively executing one function corresponding to a control command selected from the multiple control commands according to a predetermined criterion when the multiple control commands are incompatible,
wherein the multiple control commands include a first control command detected through a first sensing unit and a second control command detected through a second sensing unit, the second sensing unit being different from the first sensing unit, and
wherein the multiple functions are independent each other.

16. The controlling method of claim 15, wherein it is determined that the first control command and the second control command cannot be carried out simultaneously when a particular control command corresponds to at least one of a hovering control command for a pointer displayed; a control command for changing a menu hierarchy displayed; a control command for selecting a displayed menu; and a control command for selecting the same object.

17. The controlling method of claim 15, wherein the predetermined criterion is determined according to a priority of an entity which generates the first control command and the second control command.

18. The controlling method of claim 15, further comprising generating the display signal based on the second control command when receiving of the first control command is suspended while the second control command is received.

* * * * *